US005449619A

United States Patent [19]

Griffin et al.

[11] Patent Number: 5,449,619

[45] Date of Patent: Sep. 12, 1995

[54] DRAIN OPENER FORMULATION

[75] Inventors: William M. Griffin, Mars, Pa.; Rhonda T. Ritter, Vinton, Va.; Douglas A. Dent, Ivyland, Pa.

[73] Assignee: Sybron Chemical Holdings, Inc., Wilmington, Del.

[21] Appl. No.: 54,417

[22] Filed: Apr. 7, 1993

Related U.S. Application Data

[63] Continuation-in-part of Ser. No. 870,057, Apr. 16, 1992, abandoned.

[51] Int. Cl.[6] .......................... C12S 9/00; C12S 3/00; C12S 13/00; C02F 3/00

[52] U.S. Cl. .......................... 435/264; 435/262; 435/267; 210/601

[58] Field of Search .......................... 435/262, 264, 267; 210/610, 601; 252/174.12

[56] References Cited

U.S. PATENT DOCUMENTS

| | | | |
|---|---|---|---|
| 4,655,794 | 4/1987 | Richardson et al. | 51/293 |
| 4,752,563 | 6/1988 | Kortright et al. | 435/2 |
| 4,959,303 | 9/1990 | Milburn et al. | 435/7 |
| 4,959,304 | 9/1990 | Simonson | 435/7 |
| 5,015,385 | 5/1991 | Becker | 210/610 |
| 5,179,001 | 1/1993 | Young et al. | 435/732 |
| 5,179,018 | 1/1993 | Bogard, Jr. et al. | 530/388.15 |
| 5,187,061 | 2/1993 | Gutterson et al. | 435/5 |
| 5,192,678 | 3/1993 | Iwami et al. | 435/228 |

OTHER PUBLICATIONS

Gherna et al (eds) *ATCC Catalogue of Bacteria and Phages*, 17th Edition 1989 pp. 27, 30, 33.

*Primary Examiner*—Michael G. wityshyn
*Assistant Examiner*—T. J. Reardon
*Attorney, Agent, or Firm*—Harris Beach & Wilcox

[57] ABSTRACT

A liquid drain opener formulation which comprises a stable suspension of viable microorganisms, a surfactant, and a preservative all contained in an aqueous medium and having a pH in the range of about 3 to 10.

1 Claim, No Drawings

DRAIN OPENER FORMULATION

This application is a continuation-in-part of application Ser. No. 07/870,057, filed Apr. 16, 1992, now abandoned.

BACKGROUND OF THE INVENTION

The present invention is in general directed to a drain opener formulation, and more specifically to a formulation that provides for enhanced biological activity, safety and ease of handling.

Acid and caustic products, with and without oxidizing agents and surfactants, are commonly used to clean restricted and clogged domestic, institutional and industrial drains. These products are for the most part effective yet have severe safety, handling, and use problems. These materials are usually at the extremes of the pH scale, along with strong non-specific oxidizing agents, and result in products with a potential for inflicting serious personal injury. This necessitates extreme care in handling, storing, and dispensing. The materials enter the drain causing pipe and plumbing damage and upsets to beneficial biological activities.

It is apparent that a product that could effectively remove clogs and restrictions under more neutral conditions, with an oxidizing agent that is specific to the clog generating material, and aid in enhancing biological activity in the drains, sewers, collection systems, publically owned treatment works and septic systems would be beneficial, and overcome the problems of the prior art referred to above.

SUMMARY OF THE INVENTION

The present invention is directed to a stable suspension of viable microorganisms, surfactant(s), and preservatives in an aqueous medium. The product has numerous advantages over currently available drain openers; such as activity at pH's closer to neutral, and solubilizing ability for soaps, fats, oils and greases. It further provides for biological activity specific to lipids, proteins and carbohydrates, and establishes a biofilm in the drains and on downstream surfaces to continuously aid the natural biodegradative process.

DETAILED DESCRIPTION OF THE INVENTION

The composition of the present invention comprises a stable suspension of viable microorganisms, surfactant(s), preservatives, and optional fragrances in an aqueous medium with a preferred pH of approximately 5.0 to 6.0.

Any viable microorganisms, or mixture thereof, capable of surviving the formulation and the intended use environment, and which has the ability to degrade or promote the degradation of lipids, proteins and carbohydrates common to domestic, institutional, and industrial sewage may be used in the present invention.

Suitable types of organisms would include strains of Bacillus, Pseudomonas, Arthrobacter, Enterobacter, Citrobacter and Corynebacter. The genus Bacillus is preferred because it not only has excellent waste degrading abilities but also produces a protected spore form. A preferred bacterial component includes 3 strains of Bacillus specifically adapted for high production of extracellular enzymes, particularly proteases, amylases and cellulases. Such strains are common in waste treatment products. This preferred mixture comprises *Bacillus licheniformis, Bacillus subtilis* and *Bacillus polymyxa.*

The three specific strains are identified below:

| | |
|---|---|
| Culture 300 | *Bacillus subtilis* |
| Culture DA33 | *Bacillus licheniformis* |
| Culture polymyxa | *Bacillus polymyxa* |

These microorganisms were isolated from soil using standard microbiological procedures. Aqueous suspensions of soil were serially diluted, pour plated and incubated. Individual microbial colonies were picked from the solid plated medium and subcultured. Pure cultures were characterized as to morphology, Gram Stain and biochemical reactions. Key biochemical tests included assays for lipase, protease and amylase groups of enzymes. These enzymes catalyze the degradation of the principal chemical components of drain residues, such as grease, proteins and starches.

The isolated pure cultures were streaked on Plate Count Agar (Difco, Detroit, Mich.) medium and single colonies picked and subcultured for identification.

The identification of each isolate was determined by microscopic, cultural, biochemical and enzymatic tests. The identification of each isolate is listed below.

Results of Microscopic, Cultural, Biochemical and Enzymatic Tests for Identification of the above three Sybron/Biochemical Strains in applicant's BI-CHEM BDO product.

| TEST | 300 | DA33 | *polymyxa* |
|---|---|---|---|
| Microscopic: | | | |
| Swollen Sporangium | − | − | + |
| Cultural and Biochemical: | | | |
| Acetoin Production | + | + | + |
| Anaerobic Growth | − | + | + |
| Anaerobic Acid | − | + | + |
| Acid From Carbohydrates: | | | |
| Glucose | + | + | + |
| Arabinose | − | − | + |
| Mannitol | ± | + | + |
| Xylose | + | − | + |
| Growth in: | | | |
| Nutrient Broth | + | + | + |
| NB + 5% NaCl | + | + | − |
| Growth at: | | | |
| 37° C. | + | + | + |
| 55° C. | − | + | − |
| Enzymatic Hydrolysis of: | | | |
| Casein | + | + | + |
| Gelatin | + | + | + |
| Starch | + | + | + |
| Egg Yolk | − | − | − |

The following ATCC numbers have been assigned as of 3/23/93 to the cultures deposited by applicant with the American Type Culture Collection in support of the present invention. The cultures with the corresponding ATCC numbers are given below:

*Bacillus subtilis,* 300 ATCC 55405

*Bacillus polymyxa,* polymyxa ATCC 55407

*Bacillus licheniformis,* DA-33 ATCC 55406

These strains are available to the scientific public upon request.

The three strains included in the example are specifically adapted for high production of protease and amylase and the ability to grow on fats, oils and grease. Additional suitable microorganisms which may be used in the present invention may be selected from those disclosed in U.S. Pat. No. 4,655,794, which is incorporated herein by reference. In U.S. Pat. No. 4,655,794 the primary function of the detergent is for surface cleaning.

In addition to the above, the following is list of microorganisms available from the ATCC, with their respective ATCC designation, which are suitable for use in the formulations of the present invention.

*Bacillus licheniformis*
21417
21424
27811
39326
*Bacillus subtilis*
6051a
21228
21331
35854
*Bacillus polymyxa*
10401
12060
21551
21993
*Pseudomonas aeruginosa*
21036
29260
*Pseudomonas alkanolytica*
21034
*Pseudomonas dentrificans*
13867
*Arthrobacter paraffineus*
15590
*Arthrobacter petroleophagus*
21494
*Arthrobacter rubellus*
21495
*Arthrobacter sp.*
21908
*Enterobacter cloacae*
962
15337
27613
*Enterobacter sp.*
33241
*Citrobacter amalonaticus*
25405
25406
25407
*Citrobacter freundi*
29935
*Corynebacterium alkanum*
21194
*Corynebacterium fujiokense*
21496
*Corynebacterium hydrocarbooxydano*
21767
*Corynebacterium sp.*
53586

A suitable concentration level of viable microorganisms is about $1.0\times10^7$/ml of the formulation. An operable concentration range for the microorganisms is from about $1\times10^6$/ml to $1\times10^9$/ml, with a preferred concentration being about $1.0\times10^8$.

Unlike typical detergents, which predominately only clean surfaces, the purpose of the surfactant in the formulation of the present invention is to solubilize grease and to make it bioavailable. This is an essential requirement of the surfactant. The surfactant can be any readily biodegradable surfactant, or a mixture of surfactants with low toxicity for the microorganisms contained within the system. The surfactant(s) must have a high grease solubilizing capability and should be water soluble. Ionic surfactants or blends of nonionic/ionic surfactants having a hydrophile/lipophile balance approaching 10 are particularly preferred for the necessary grease solubilization. Typical surfactants suitable for use with the present invention include n-alkyl benzene sulfonates and alkyl sulfonates. The surfactant is present in a concentration from about 3 to 10 weight percent.

The pH of the solution should be maintained as near as possible to neutral to insure adequate bacterial activity, and to minimize health risk, but be in a range compatible for surfactant activity and conducive to the survival of the bacteria. An operable pH range can be between about 3.0 to 10.0.

A preservative such as paraben, methyl paraben, or 1-2-benzisothiazolin-3-one is added to inhibit or prevent the growth of undesirable microbial contaminants in the product. The necessity for a preservative is greatest when the pH is near neutral, and the least when the pH is at the extreme ends of the operable range. The concentration of the preservative is determined by the vendor's recommendations. A typical concentration range for the preservative used in the example is from about 0.075 to 0.75 weight percent.

An additional optional preservative can be added specifically to preserve the spore form of the microorganisms. Methyl anthranilate in concentrations of from about 25 to 50 ppm (w/v) by weight has been found to be a satisfactory additive.

Optionally a chelating agent is added to enhance stabilization of the formulation.

The table below illustrates the various components used in the present invention with their respective chemical names, functions and sources.

| Component | Vendor | Specific Component | Function |
|---|---|---|---|
| Biosoft S-100 | Stepan Co. | Dodecylbenzenesulfonic Acid | Surfactant for enhancing bioavailability |
| Lemon Fragance | Arrylessence | Natural fragrance | Odor making agent |
| HAMPENE ®100S | W. R. Grace & Co. | EDTA[1] | Chelating agent |
| Methyl Anthranilate | Aldrich Chemical Co. | As named | Spore preservative |
| No. 6552 Herc Mint Green | Warner-Jenkinson | FD&C Blue #1 FD&C Yellow #5 (Prop. Mix) | Color consistency |
| Proxel ® GXL | ICI Americas | 1,2-benzisothiazolin-3-one | Formulation Preservative |

[1]Tetrasodium Ethylenediaminetetraacetate

A fragrance can optionally be added to mask the odor of the product components, and for market appeal. The fragrance must be compatible with the other components of the formulation.

The operating and preferred concentration ranges for the essential ingredients or components of the present invention are as follows in weight percent:

| Component | Operating Range | Preferred Range or Concentration |
|---|---|---|
| Microorganisms | $1 \times 10^6$/ml-$1 \times 10^9$/ml | $1 \times 10^8$ |
| Surfactant | 3-10% | 3-5% |
| Preservative | 0.075-0.75% | 0.075% |
| Water | Balance | Balance |

The following example illustrates one embodiment of preparing microorganisms for use in the present invention.

EXAMPLE

Into 1100 gallons tap water are added the following nutrients:

9.6 oz. yeast extract
29 oz. dextrose
9.6 oz. ammonium sulfate
40 oz. monosodium phosphate
2.2 lbs. sodium chloride This water mixture is sterilized for 30 minutes at 15 pounds pressure and 250 degrees F. The water mixture is cooled and innoculated with *Bacillus subtilis,* Culture 300. The bacteria are allowed to grow for 28 hours with aeration at 88° F. (Concentration of spores should be about $=1\times10^9$/ml.

The above procedure is separately repeated for *Bacillus licheniformis,* Culture DA 33 and *Bacillus polymyxa,* Culture polymyxa respectively, resulting in three separate bacterial suspensions.

Procedure For Formulating Drain Opener:

Bacterial spore suspension made by the Example set forth above are diluted to give counts on the order of $10^7$ to $10^8$ bacteria/ml.

A total of 3400 ml of a bacterial mixture is made from the 3 suspensions in a ratio by volume of 90% *Bacillus licheniformis,* Culture DA 33, 5% *Bacillus subtilis,* Culture 300 and 5% *Bacillus Polymyxa,* Culture polymyxa. The following components are then added.

0.1 ml of methyl anthranilate is added.
113.5 ml of Biosoft-100 surfactant is added.
5.68 ml of Proxel preservative is added.
19 ml of lemon fragrance is added.
1 gram of green dye is added slowly.
17 grams of EDTA is added.
pH is adjusted to 5.0 with NaOH.

The final volume is adjusted to 3785 ml (1 gallon) by adding sterilized water.

The mixture is agitated through the final step of volume adjustment. It is important that all components are added to the bacterial mixture (the largest volume) to attenuate the pH swing associated with the addition of the Biosoft-100 surfactant (acidic solution).

In practice, a clogged drain can be treated with approximately one pint of the product of the present invention. The drain problem may be associated with standing water or may not be associated with standing water (a slow flowing drain). The material is left to stand overnight. Hot tap water is flushed through the drain to remove the dissolved clog. The drain can be treated for shorter periods (but no less than 3 hrs). The drain may, however, require repeated treatments. The bacteria are available to colonize the surfaces of the pipe and provide additional cleansing of the pipe wall, thereby reducing the chances of re-clogging.

The effectiveness of the product has been demonstrated on artificial drain clogs. The artificial clog consisted of Crisco (Proctor and Gamble) which was layered into the drain. One hundred mls of the drain opener formulation prepared in the above examples, Liquid Plumber (Clorox) and Liquid Draino (Drackett Products) were added to an identical test drain in three separate comparative tests. With an overnight exposure 95% of the grease was removed by the drain opener of the present invention while the other two products had no effect on grease removal. The solubilized grease in the drain treated with the formulation of the present invention was easily removed with a hot water rinse.

While the invention has been described in detail with respect to specific embodiments thereof, it will be understood by those skilled in the art that variations and modifications may be made without departing from the essential features thereof.

We claim:

1. A liquid drain opener formulation which comprises viable microorganisms, adapted for production of protease, amylase and lipase, in a concentration from about $1\times10^6$/ml to $1\times10^9$/ml and in the form of a mixture of three strains of Bacillus in amounts suitable to promote the degradation of drain residues, a surfactant which exhibits a grease solubilizing capability selected from the group consisting of n-alkyl benzene sulfonates and alkyl sulfonates, and a preservative which functions to inhibit or prevent the growth of microbial contaminants in the formulation, all being contained in an aqueous medium having a pH of from about 3.0 to 10, and where said, three strains of Bacillus comprise *Bacillus licheniformis, Bacillus subtilis,* and *Bacillus polymyxa,* having all the identifying characteristics of American Type Culture Collection deposit Nos, 55406, 55405, and 55407, respectively, or mutants thereof possessing all the identifying characteristics thereof.

* * * * *